United States Patent Office 3,121,584
Patented Feb. 18, 1964

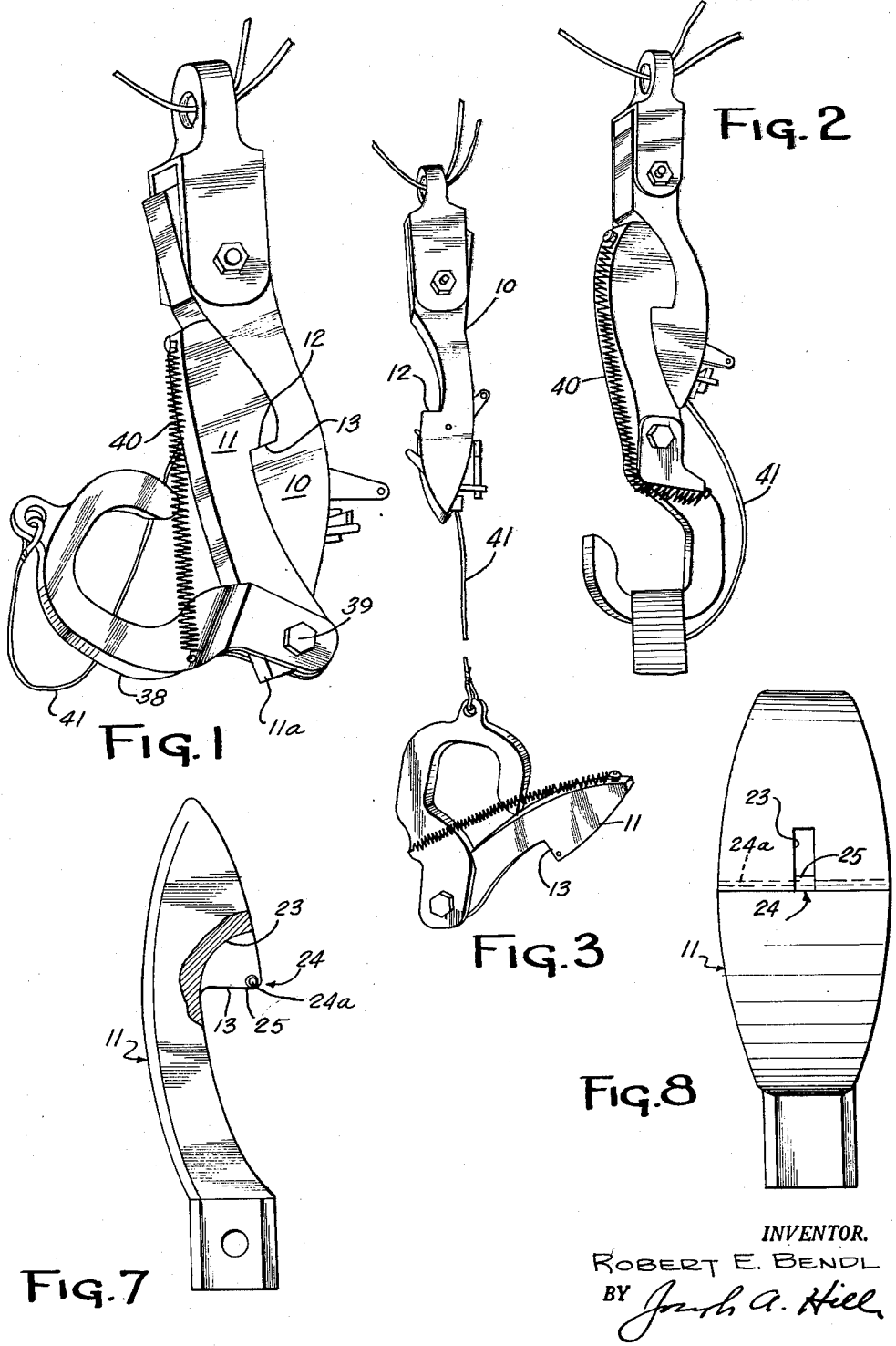

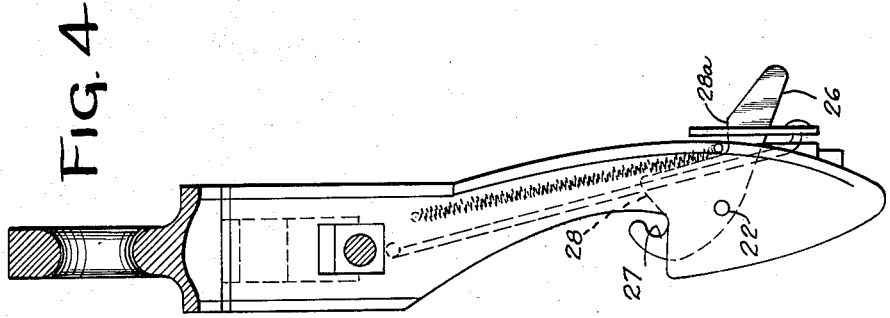
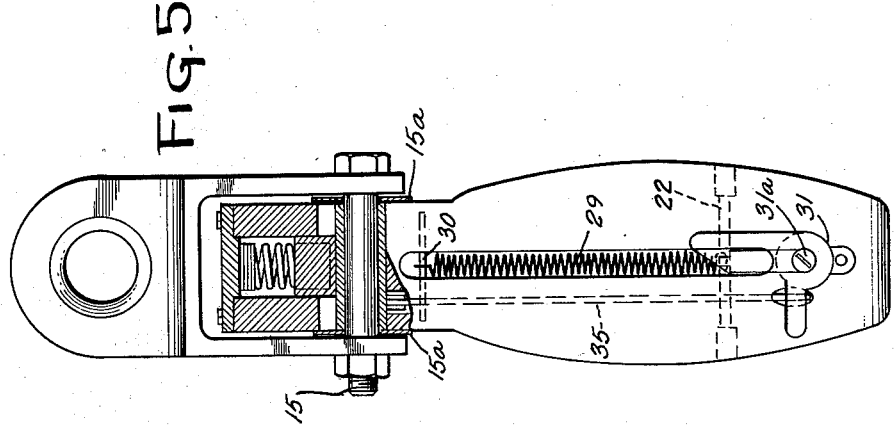
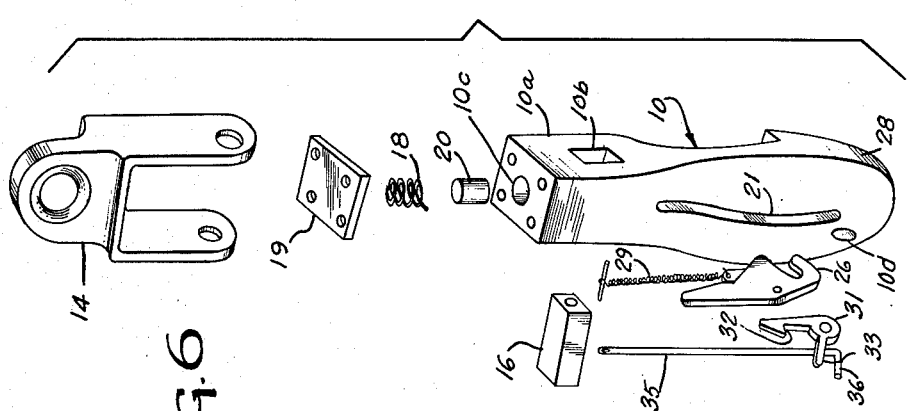

3,121,584
JETTISON HOOK FOR EXTERNAL CARGO LOAD
Robert E. Bendl, Grafton Court, R.F.D. 2, Denbigh, Va.
Filed Feb. 6, 1963, Ser. No. 256,777
2 Claims. (Cl. 294—83)
(Granted under Title 35, U.S. Code (1952), sec. 266)

The invention described herein may be manufactured and used by or for the Government for governmental purposes without the payment to me of any royalty thereon.

The present invention relates to the field of cargo hooks more particularly to a releasable cargo hook designed for quick jettison of a load which has been carried slung beneath a helicopter and lowered to the ground. This invention is an improvement on the releasable cargo hook disclosed in my patent application Number 166,437, filed January 16, 1962.

An object of this invention is to provide an improved jettison hook for carrying an external cargo load suspended below a helicopter.

Another object of the invention is to provide an improved hook of the character described having particular locking and automatic disengagement means which will arm the hook during loading and will cause the hook to jettison the load automatically when the load touches the ground.

Another object of the invention is to provide a hook of the character described and of the closed throat type suitable for picking up loads from the decks of ships and other watercraft.

Another object of the invention is to provide a jettison hook of the character described having all elements connected together so that the hook may be reused readily after a load is jettisoned.

The advantages inherent in the jettison hook of the present invention and the other uses to which it may be put will be apparent from the attached drawings and the description which follows. For example, it will be clear that the present invention lends itself to use with parachute dropped loads as well as to helicopter carried loads.

In the accompanying drawings:

FIG. 1 is a perspective view of the complete jettison hook before attachment of a load;

FIG. 2 is a perspective view of the complete jettison hook with load attached;

FIG. 3 is a perspective view of the complete jettison hook after release of the load;

FIG. 4 is a side elevation, partly in section, of the upper connector block;

FIG. 5 is a rear elevation, partly in section of the upper connector block;

FIG. 6 is an exploded perspective view of the upper connector block showing its principal components;

FIG. 7 is a side elevation, partly in section, of the lower connector block; and FIG. 8 is a front elevation of the lower connector block.

Referring to FIGS. 1, 2 and 3, the improved jettison hook comprises, as does the releasable cargo hook of my application Serial Number 166,437, an upper connector block 10 and lower connector block 11 of almost identical shape, generally rectangular in cross section. Both connector blocks taper from their midsections toward both ends and each is cut back at its midsection forming a transverse shelf 12 in upper connector block 10 and a transverse shelf 13 in lower connector block 11.

When ready for loading and when carrying a load, the two connector blocks are mated as shown in FIGS. 1 and 2, transverse shelves 12 and 13 interengaging to hold the blocks together against the tension of a load.

Referring to FIGS. 4, 5 and 6, the butt end 10a of upper connector block 10 is provided with transverse rectangular bore 10b and longitudinal circular bore 10c communicating therewith. A clevis eye 14 is connected to butt end 10a of upper connector block 10 by a pivot bolt 15 which extends through block 16 which is, in turn, received in the transverse rectangular bore 10b. The height of transverse bore 10b is greater than the height of block 16 so that the block is free to slide a limited distance in a vertical direction when the hook is at its normal load carrying position. Washers 15a encircle pivot bolt 15 at points between upper connector block 10 and clevis eye 14 so that the clevis eye can pivot freely.

The longitudinal circular bore 10c, in butt end 10a of the upper connector block, communicates with transverse rectangular bore 10b and contains a compression spring 18 which bears at one end against cover 19, bolted to end of connector block 10, and at the other end against cylindrical piston 20. The spring 18 through piston 20 resiliently urges block 16 against the bottom surface of transverse rectangular bore 10b when the hook is not loaded, but when the hook is loaded spring 18 is compressed and block 16 moves upwardly until it contacts the upper surface of transverse rectangular bore 10b.

Slot 21 is cut through the upper connector block 10. Referring now to FIGS. 7 and 8, lower connector block 11 is provided with a slotted recess 23 which registers with slot 21 when the two connector blocks are joined. Latching pin 24 consisting of a pin 24a and sleeve 25 is mounted in connector block 11 across slotted recess 23 at the outer end of transverse shelf 13.

A cam lever 26 is pivotally mounted in slot 21 of upper connector block 10 on pin 22. Cam lever 26 has a latching notch 27 (see FIG. 4) which engages latching pin 24 of lower connector block 11 when the two connector blocks are joined. Camming surface 28 is formed on cam lever 26 adjacent latching notch 27 so that when the outer end of cam lever 26 moves upward, camming surface 28 bears against latching pin 24 and helps to separate the two connector blocks. A tension spring 29 disposed in slot 21 is connected at one end to cam lever 26 and at the other end to anchor pin 30. When the jettison hook is carrying a load and is in an armed condition, as hereafter described, tension spring 29 continuously urges lever 26 from its down or latched position to its up or unlatching position. However, the weight of the load, together with the angle at which transverse shelves 12 and 13 are cut, prevents the connector blocks from separating.

When the hook is in its ready condition before loading, as shown in FIG. 1, means must be provided to prevent tension spring 29 from tripping cam lever 26 causing the connector blocks to separate. Locking lever 31 constitutes such a means. Locking lever 31 which is generally L-shaped (see FIGS. 5 and 6) is pivotally mounted at its angle to connector block 10 by pivot pin or rivet 31a. A hook 32 is formed on one arm of locking lever 31 for engaging locking surface 28a of cam lever 26. The other arm 33 of locking lever 31 is used in actuating the locking lever. The locking lever is resiliently urged into locking engagement with the locking surface 28a of cam lever 26 by a torsion spring, not shown, which encircles pivot pin 31a on which the locking lever is mounted. Link 35 is disposed in circular passage 10d drilled in upper connector block 10. The link is connected at its upper end to block 16 and has a hook 36 formed at its lower end which projects out of passage 10d and engages arm 33 of locking lever 31.

When the hook is in its ready position, as in FIG. 1, and while it is being loaded, cam lever 26 is locked at its down position by locking lever 31 which occupies the position shown in FIGS. 4 and 5. As soon, however, as the load is secured on the hook and the helicopter starts to lift the load, clevis eye 14 will be moved upwardly in relation to connector block 10, spring 18 being compressed. Block 16 moves to its upward position carrying with it link 35 and causing hook 36 to rotate locking lever 31 in a clockwise direction as seen in FIG. 5 unlocking cam lever 26 and arming the jettison hook. Blocks 10 and 11 will thereafter separate to release the load whenever the tension on the hook assembly is relieved as by setting the load down on the ground or another surface. The same series of events will occur if the load were attached in an aircraft to a jettison hook connected to a parachute and the load and parachute thereafter dropped. When the parachute opened upward force applied through clevis eye 14, block 16 and link 35 would unlock locking lever 31. The jettison hook assembly would then be armed and ready to release the load when it touched the ground.

Referring now to FIGS. 1, 2 and 3, a generally C-shaped hook 38 is pivotally connected by pin or bolt 39 to the butt end 11a of lower connector block 11. A tension spring 40 is connected as shown to connector block 11 and load carrying hook 38. Tension spring 40 resiliently urges load carrying hook 38 to a folded or closed throat position relative to connector block 11. In this position, illustrated in FIG. 1, when the pilot of the helicopter approaches a load to make an aerial pick-up the load carrying hook cannot accidentally engage another object such as a handrail or cable on the deck of a ship from which the load is to be picked. Spring 40 is of such strength that the load carrying hook 38 can be manually opened to the position shown in FIG. 2 by ground or deck personnel. The sling by which the load is carried can then be slipped over load carrying hook 38 by the loading personnel.

A flexible connector cable 41 is affixed at one end to a point near the bottom of upper connector block 10 and at its other end to load carrying hook 38 below the bight of the hook. When the helicopter touches down its load, upper and lower connector blocks 10 and 11 separate as is explained previously. The pilot of the helicopter then makes his craft rise. Cable 41 pulls on the bottom of hook 38 turning the hook upside down as shown in FIG. 3. Either while or after the load carrying hook 38 is being turned the load sling slides out of load carrying hook 38 and past lower connector block 11. The jettison hook is then completely free of the load and the helicopter may depart. Connector cable 41, however, retains lower connector block 11 and load carrying hook 38 so that all parts of the hook assembly are returned to the loading station where the operator can reassemble the hook assembly before attaching a new load.

I claim:
1. A jettison hook for quick separation of a load from its carrier comprising:
   a. Upper and lower interengaging connector blocks;
   b. A load carrying hook pivotally attached to said lower connector block and cable-connected to said upper connector block;
   c. Latching means coacting with said connector blocks to secure them to each other;
   d. Load responsive locking means coacting with said latching means to lock said latching means in its latched position until the load is lifted by said load carrying hook; and
   e. Load responsive separating means coacting with said connector blocks to cause said connector blocks to separate when the load is set down.
2. A jettison hook as described in claim 1 wherein:
   a. Said upper and lower connector blocks each comprises a comating notched portion which includes a substantially transverse shelf;
   b. Said latching means comprises a latch pin recessed in said lower connector block and a cam lever having a latch pin-engaging hook pivotally recessed in said upper connector block;
   c. Said load responsive locking means comprises a locking surface on said cam lever, a locking hook pivotally mounted on said upper connector block to selectively engage and disengage said locking surface, a spring biased block mounted for vertical sliding movement in a transverse bore in said upper connector block, a clevis supporting said spring biased block, and a link slidably recessed within said upper connector block interconnecting said spring biased block and said pivoted locking hook; and
   d. Said load responsive separating means comprises the said latching pin, a camming surface on said cam lever which coacts with said latching pin to move said connector blocks out of engagement when said cam lever is rotated towards its unlatching position, and resilient means urging said cam lever to its unlatching position.

References Cited in the file of this patent
UNITED STATES PATENTS
2,682,425   Staats _____ June 29, 1954
2,889,168   Engehardt _____ June 2, 1959
2,984,041   Banker _____ May 16, 1961

FOREIGN PATENTS
143,348   Great Britain _____ May 27, 1920